United States Patent [19]

Kayama

[11] Patent Number: 5,038,628
[45] Date of Patent: Aug. 13, 1991

[54] SYNCHRONIZER RING FOR SYNCHRONOUS MESHING TYPE SPEED CHANGE GEAR

[75] Inventor: Shigeoki Kayama, Chigasaki, Japan

[73] Assignee: NSK-Warner K. K., Tokyo, Japan

[21] Appl. No.: 403,948

[22] Filed: Sep. 7, 1989

[30] Foreign Application Priority Data

Sep. 14, 1988 [JP] Japan .............. 63-119816[U]

[51] Int. Cl.⁵ .................. F16H 3/38; F16D 13/24
[52] U.S. Cl. .................... 74/339; 192/53 F; 192/113 R; 74/467
[58] Field of Search .......... 74/339, 467, 468; 192/53 F, 113 R

[56] References Cited

U.S. PATENT DOCUMENTS

| | | | |
|---|---|---|---|
| 1,854,281 | 4/1932 | Thompson | 74/339 |
| 4,209,086 | 6/1980 | Friedrich | 74/339 X |
| 4,267,912 | 5/1981 | Bauer et al. | 192/53 |
| 4,314,627 | 2/1982 | Nozawa | 74/339 X |
| 4,679,681 | 7/1987 | Creydt et al. | 192/53 F |

FOREIGN PATENT DOCUMENTS

| | | | |
|---|---|---|---|
| 3212720 | 10/1983 | Fed. Rep. of Germany | 192/53 F |
| 47-24053 | 7/1972 | Japan . | |
| 48-7003 | 3/1973 | Japan . | |
| 54-165640 | 11/1979 | Japan . | |
| 0012122 | 1/1982 | Japan | 74/339 |
| 0195923 | 12/1982 | Japan | 192/53 F |
| 0187114 | 10/1984 | Japan | 192/53 F |
| 63-3172 | 1/1988 | Japan . | |
| 0176827 | 7/1988 | Japan | 192/53 F |

Primary Examiner—Allan D. Herrmann
Assistant Examiner—Benjamin Levi
Attorney, Agent, or Firm—Shapiro and Shapiro

[57] ABSTRACT

A synchronizer ring for a synchronous meshing type speed change gear has a substantially conical surface and is provided with a wet frictional material which covers a major portion of the conical surface axial length, having a small diameter end spaced from the small diameter end of the conical surface. The frictional material has at least one continuous groove formed on its frictional surface and communicating with opposite ends of the synchronizer ring for conducting a flow of lubricating oil, the groove being formed at a predetermined angle relative to the generatrix of the synchronizer ring. The ring is constructed such that upon frictional engagement with the speed change gear, the small diameter end of the conical surface projects axially outwardly from a corresponding end of a frictional engaging surface of the speed change gear by a predetermined amount, so as to facilitate receipt of oil into the groove.

8 Claims, 2 Drawing Sheets

FIG. 4
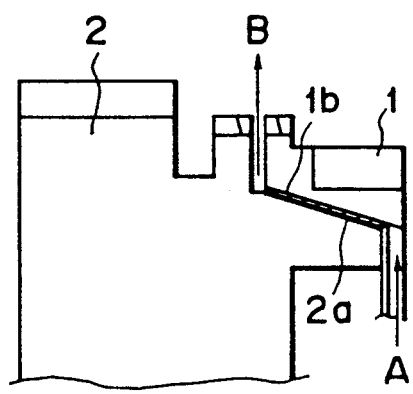
FIG. 5    FIG. 6    FIG. 7
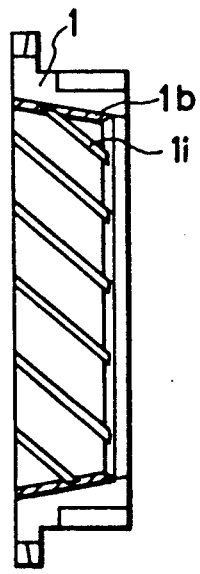 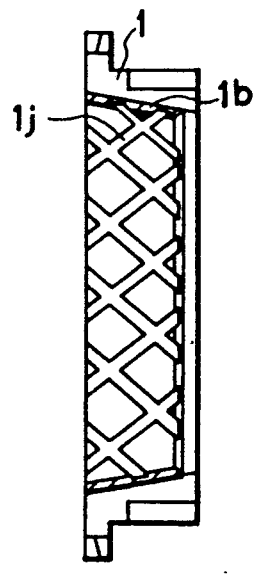 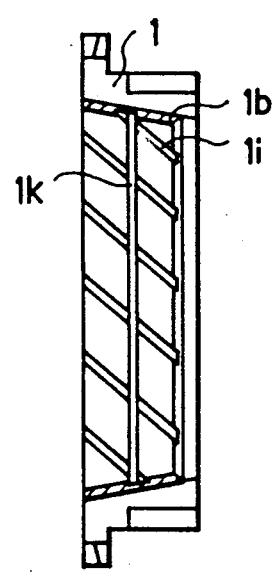

SYNCHRONIZER RING FOR SYNCHRONOUS MESHING TYPE SPEED CHANGE GEAR

BACKGROUND OF THE INVENTION

1. Field of the Invention

The present invention relates to a synchronizer ring for a synchronous meshing type speed change gear and, more particularly, to a synchronizer ring for a synchronous meshing type speed change gear having a wet frictional material (i.e., a frictional material to be used in the presence of a lubricating oil, for example).

2. Related Background Art

Various synchronizer rings for a synchronous meshing type speed change gear and having a wet frictional material have previously been proposed. FIG. 1 is a diagram showing a cross sectional view of one such synchronizer ring. A wet frictional material 10b is attached to an inner surface 10a of a synchronizer ring body 10 by a method such as adhesion or the like. As shown in FIG. 2, during a speed changing operation, the wet frictional material 10b is pressed onto a frictional engaging surface 20a of a desired speed change gear 20 and synchronizes the rotation of the gear 20. The use of wet frictional material 10b provides an advantages that the operating force upon speed change decreases. On the other hand, since a lubricating oil enters the surface of the frictional material 10b, also a drawback in that there is a possibility of under-synchronization. Therefore, it has also been proposed to provide the frictional material with surface grooves such as 10c and 10d, as shown in FIG. 1, for the purpose of discharging the oil. However, even in the synchronizer ring having such a structure, the heat which is generated when the frictional material 10b comes into engagement with the frictional engaging surface 20a of the gear 20 cannot be sufficiently removed by the lubricating oil. The temperature of frictional material 10b may thus become excessive during the use of the ring, causing reduced durability.

SUMMARY OF THE INVENTION

It is an object of the present invention to provide a synchronizer ring having a structure which solves the above problems.

In summary, the invention provides a synchronizer ring for a synchronous meshing type speed change gear, and a speed change gear drive incorporating such a ring. The ring has a body with a substantially conical peripheral surface and is provided with a wet frictional material which covers a major portion of the conical surface axial length. The frictional material has, on its frictional surface, at least one continuous groove communicating with opposite axial ends of the frictional surface in order to conduct a flow of lubricating oil, the forming direction of the continuous groove being set so as to have a predetermined angle relative to a generatrix of the conical peripheral surface. When the ring is frictionally engaged with the speed change gear, the small diameter end of the conical peripheral surface projects axially outwardly from a corresponding end of the frictional engaging surface of the speed change gear by a predetermined amount.

In the above construction, a substantial amount of lubricating oil can flow between the frictional surface of the frictional material of the synchronizer ring and the frictional engaging surface of the gear. Therefore, the heat which is generated in the frictional material is absorbed by the lubricating oil and the temperature of frictional material does not become excessive. Thus, the durability of frictional material is improved.

BRIEF DESCRIPTION OF THE DRAWINGS

FIG. 4 is an explanatory diagram depicting operation of the synchronizer ring of the invention; and FIGS. 5, 6, and 7 are diagrams showing cross sectional shapes of synchronizer rings of second, third and fourth embodiments of the invention.

DESCRIPTION OF THE PREFERRED EMBODIMENTS

A synchronizer ring for a synchronous meshing type speed change gear according to the invention will be described hereinbelow with reference to the accompanying drawings.

Figure 1:
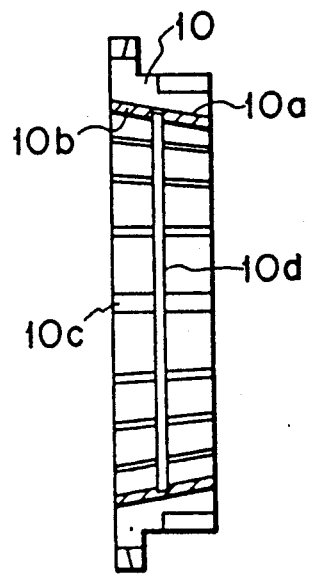
FIG. 1 is a diagram showing a cross sectional shape of a conventional synchronizer ring.
Figure 2:
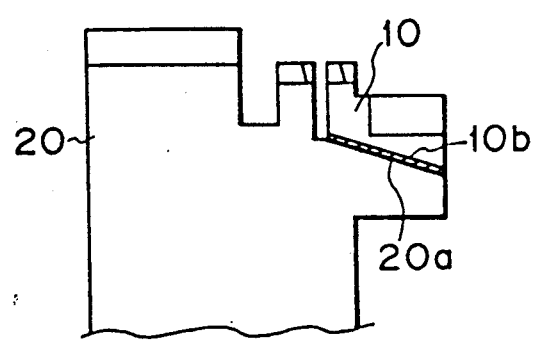
FIG. 2 is an explanatory diagram depicting operation the conventional synchronizer ring.
Figure 3A:
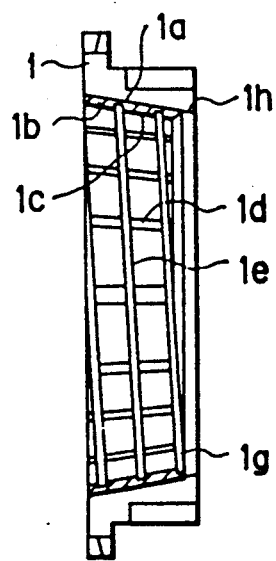
FIGS. 3A and 3B are diagrams showing a cross sectional shape of a synchronizer ring of a first embodiment of the invention.

FIG. 3A is a diagram showing a cross sectional shape of a synchronizer ring according to a first embodiment of the invention. The synchronizer ring includes a synchronizer ring body 1 having a substantially conical peripheral surface 1a. In the form shown, the surface 1a is arranged at the inner surface of the synchronizer ring body 1, but it can be alternatively provided at the outer surface of ring body 1, as may be dictated by the structure of the speed change gear. A wet frictional material 1b, such as a porous frictional material of the paper lining type, is attached by any suitable method (e.g., adhesion) to surface 1a and covers the surface 1a over a major portion of its axial length. In accordance with the invention, the small diameter end of friction material 1b is spaced from the small diameter end of surface 1a, which is therefore uncovered as seen at 1h. First grooves 1d, which extend longitudinally in planes containing the axis of the synchronizer ring body 1, and a continuous spiral second groove 1e, which spirals about the axis of the ring body, are formed on the adhered frictional material 1b as oil grooves. The oil grooves communicate with both ends of material 1b to conduct a flow of lubricating oil. The first grooves 1d are provided principally to prevent under-synchronization when the speed is changed. The spiral groove 1e will be discussed in further detail later.

Figure 3B:
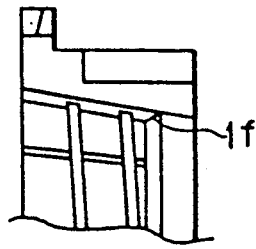

As shown in FIG. 3B, which is a partial enlarged diagram of FIG. 3A, the small diameter end of frictional material 1b preferably has a chamfered edge portion 1f. The intersection of edge portion 1f and spiral groove 1e constitutes a lubricating oil lead-in or intake portion 1g for conducting lubricating oil into the gap between the frictional material 1b and the gear 2.

The above-described synchronizer ring structure may be formed by adhering frictional material to the entire conical surface 1a and then cutting out the small diameter end portion of the frictional material, as by lathe turning or the like. In this way, the chamfered portion 1f can be formed simultaneously. Chamfered portion 1f may, of course, be formed later by another machining step.

FIG. 4 is a cross sectional view of the main section of a speed change gear drive showing an operating state of the synchronizer ring of the present invention. In this state, the ring is pressed onto a speed change gear 2, with the conical surface 1c of the frictional material 1b being in face-to-face frictional engagement with an oblique frictional engaging surface 2a of the gear 2. During the speed change operation, the synchronizer ring is moved in its axial direction, so that a gap between the conical surface 1c of the frictional material and the oblique surface 2a of the gear 2 is narrowed and the frictional material 1b is pressed onto the oblique surface 2a at a predetermined pressure, thereby to synchronize the rotation of the gear 2.

As shown in FIG. 4, the synchronizer ring body 1 is constructed such that the non-covered end portion 1h of the surface 1a projects axially outward from the oblique surface 2a of the gear 2 by a predetermined amount when the synchronizer ring and gear 2 are engaged.

An explanation will now be made with respect to the flow of the lubricating oil between the synchronizer ring and the gear 2 at the time of speed change.

Upon speed change, lubricating oil is splashed typically from a direction as indicated by arrow A in FIG. 4 by, for instance, the rotation of another gear or the like. Since non-covered end portion 1h of the surface 1a of the synchronizer ring body 1 projects axially outward from the gear 2, it efficiently receives the lubricating oil which is splashed in this manner. The lubricating oil thus received by the projecting portion 1h passes through the lubricating oil lead-in portion 1g and into the spiral groove 1e. Since the lead-in portion 1g is constructed with a chamfered edge portion 1f of frictional material 1b, the lubricating oil can flow more readily through the lead-in portion than would be the case if the small diameter end of frictional material 1b were straight-cut (no chamfer). The lubricating oil which flows to the lead-in portion 1g is subjected to a centrifugal force of the rotating synchronizer ring and flows in the spiral groove 1e from the small diameter end to the large diameter end of frictional material 1b. The oil is then discharged at the large diameter end of surface 1a (in the direction of arrow B in FIG. 4) by the centrifugal force. Since the lubricating oil flows in the spiral groove 1e, the heat which is generated by friction between the circular cone surface 1c and the oblique surface 2a of the gear 2 upon speed change can be effectively absorbed. Therefore, it is possible to prevent the temperature of the frictional material 1b from becoming excessive. Notably, the cooling will be more effective if the spiral groove 1e is formed such that its advancing direction is opposite to the rotating direction of the synchronizer ring, as viewed from the small diameter side of the synchronizer ring body 1, because the lubricating oil is more rapidly discharged.

A synchronizer ring of a second embodiment will now be described with reference to FIG. 5. The embodiment of FIG. 5 is of similar basic construction to that of FIG. 3A. Only the oil groove arrangement differs from the first embodiment, and substantially the same effects are obtained. In the second embodiment, a plurality of oblique (with respect to the generatrix of surface 1a) grooves 1i communicating with both ends of the frictional material 1b are provided in place of the spiral groove. Even in the second embodiment, if the oblique grooves 1i are formed such that the advancing direction is opposite to the rotating direction of the synchronizer ring as viewed from the small diameter side of the ring body 1, the lubricating oil can be more rapidly discharged.

FIG. 6 shows a synchronizer ring of a third embodiment of the invention. In the third embodiment, in addition to oil grooves such as in the second embodiment shown in FIG. 5, additional oil grooves 1j inversely oblique with respect to the generatrix of surface 1a are further provided. Therefore, when the synchronizer ring rotates in either direction, the lubricating oil can be promptly discharged.

FIG. 7 shows a synchronizing ring of a fourth embodiment of the invention. In this embodiment, in addition to oblique oil grooves such as in the second embodiment, at least one groove 1k which extends in the circumferential direction of the synchronizer ring body 1 is provided. The additional groove 1k provides enhanced performance in terms of preventing under-synchronization.

Advantageously, so long as another gear or the like rotates, the lubricating oil flows in the spiral and oblique grooves as mentioned above. Therefore, even after the speed changing operation is finished, an increase in temperature of the frictional material 1b can be prevented.

As will be appreciated by those skilled in the art, the invention admits of considerable freedom of design. For example, the size and the pitch of the spiral groove, the angle of the oblique grooves, the size of the projecting portion, the size of the lead-in portion, etc. can be selected as appropriate for the speed change gear, the kind of lubricating oil, etc. involved in a given application.

With the above construction principles, a synchronizer ring having a wet frictional material of excellent durability is achieved.

What is claimed is:

1. A synchronous speed change gear drive, comprising:
   a speed change gear having a substantially conical peripheral frictional engagement surface, and
   a synchronizer ring including
     a synchronizer ring body having a substantially conical peripheral surface complementary to and substantially coaxially aligned with said frictional engagement surface of said speed change gear,
     a wet-type frictional material attached to and circumferentially covering said peripheral surface of said synchronizer ring body for a major portion of the axial length of said peripheral surface of said synchronizer ring body, and
     groove means having at least one continuous groove formed in a frictional surface of said frictional material and communicating with a small diameter axial end and a large diameter axial end of said frictional material for conducting a flow of lubricating fluid along said frictional surface from said small diameter axial end to said large diameter axial end under contrifugal force generated by rotation of said synchronizer ring body, said small diameter end of said frictional material being spaced at a predetermined distance from a small diameter axial end of said peripheral surface of said synchronizer ring body,
   said synchronizer ring being axially displaceable relative to said frictional engagement surface of said speed change gear to bring said frictional material into and out of engagement with said frictional engagement surface of said speed change gear, said synchronizer ring body and said speed change gear being arranged such that when said synchronizer ring and said frictional engagement surface of said speed change gear are engaged through said frictional material, an annular portion of said peripheral surface of said synchronizer ring body between said small diameter axial end of said frictional material and said small diameter axial end of said peripheral surface of said synchronizer ring body projects axially outwardly by a predetermined amount from an axial end of said speed change gear to receive lubricating fluid for introduction into said groove means.

2. A synchronous speed change gear drive according to claim 1, wherein said small diameter axial end of said frictional material has a chamfered edge and said continuous groove merges into said chamfered edge.

3. A synchronous speed change gear drive according to claim 1, wherein said continuous groove spirals about the axis of said synchronizer ring body.

4. A synchronous speed change gear drive according to claim 1, wherein said continuous groove is oblique with respect to the generatrix of said peripheral surface of said synchronizer ring body.

5. A synchronizer ring according to claim 4, wherein said groove means includes a plurality of oblique grooves spaced about the circumference of said frictional material and having a common angle with respect to said generatrix.

6. A synchronizer ring according to claim 5, wherein said groove means includes an additional plurality of oblique grooves inversely oblique with respect to said generatrix relative to said first-mentioned plurality of grooves.

7. A synchronizer ring for a synchronous meshing type speed change gear, comprising:

a synchronizer ring body having a substantially conical peripheral surface, a wet-type frictional material attached to said peripheral surface and circumferentially covering said peripheral surface for a major portion of the axial length of said peripheral surface, groove means including first and second pluralities of continuous grooves formed n a frictional surface of said frictional material and communicating with a small diameter axial end and a large diameter axial end of said frictional material for conducting a flow of lubricating fluid along said frictional surface from said small diameter axial end to said large diameter axial end of said frictional material under centrifugal force generated by rotation of said synchronizer ring body, with said small diameter axial end of said frictional material being spaced at a predetermined distance from a small diameter axial end of said peripheral surface, said first plurality of grooves being spaced about the circumference of said frictional material and formed at a common oblique angle with respect to the generatrix of said peripheral surface, and said second plurality of grooves being spaced about the circumference of said frictional material and formed inversely oblique to said generatrix relative to said first plurality of grooves, and means including an annular portion of said peripheral surface between said small diameter axial end of said frictional material and said small diameter axial end of said peripheral surface for receiving lubricating fluid for introduction into said groove means.

8. A synchronizer ring according to claim 7, wherein said small diameter axial end of said frictional material has a chamfered edge and said pluralities of grooves merge into said chamfered edge.

* * * * *